United States Patent
Monahan (10) Patent No.: US 12,370,942 B2
(45) Date of Patent: Jul. 29, 2025

(54) BRAKE APPLICATION DETECTION

(71) Applicant: Harley-Davidson Motor Company, Inc., Milwaukee, WI (US)

(72) Inventor: Tim Monahan, Brookfield, WI (US)

(73) Assignee: Harley-Davidson Motor Company, Inc., Milwaukee, WI (US)

(*) Notice: Subject to any disclaimer, the term of this patent is extended or adjusted under 35 U.S.C. 154(b) by 488 days.

(21) Appl. No.: 17/859,269

(22) Filed: Jul. 7, 2022

(65) Prior Publication Data

US 2024/0010121 A1    Jan. 11, 2024

(51) Int. Cl.
  *B60Q 1/44*     (2006.01)
  *B60Q 9/00*     (2006.01)
  *B60T 17/22*    (2006.01)

(52) U.S. Cl.
  CPC ............ *B60Q 1/44* (2013.01); *B60Q 9/00* (2013.01); *B60T 17/22* (2013.01); *B60T 2210/14* (2013.01); *B60T 2240/00* (2013.01); *B60T 2240/02* (2013.01); *B60T 2250/00* (2013.01); *B60T 2270/406* (2013.01)

(58) Field of Classification Search
  CPC .. B60Q 1/44; B60Q 9/00; B60T 17/22; B60T 2210/14; B60T 2240/00; B60T 2240/02; B60T 2250/00; B60T 2270/406
  See application file for complete search history.

(56) References Cited

U.S. PATENT DOCUMENTS

| | | | |
|---|---|---|---|
| 3,709,567 A | 1/1973 | Van Ostrom et al. | |
| 4,562,902 A | 1/1986 | Scibbe | |
| 5,026,124 A | 6/1991 | Resch | |
| 6,505,893 B2 | 1/2003 | Schmidt et al. | |
| 7,673,949 B2 | 3/2010 | Kuramochi et al. | |
| 8,083,041 B2 | 12/2011 | Capito et al. | |
| 9,527,489 B2 | 12/2016 | Joyce et al. | |
| 9,827,961 B2 | 11/2017 | Spieker et al. | |
| 10,351,117 B2 | 7/2019 | Isono | |

(Continued)

FOREIGN PATENT DOCUMENTS

| CN | 105128729 A | * 12/2015 |
|---|---|---|
| DE | 102020206236 A1 | * 11/2021 |

(Continued)

OTHER PUBLICATIONS

Turnovec, Petr, "Vehicle Slip Ratio Control System for Torque Vectoring Functionality," May 2019, Czech Technical University in Prague, pp. 6-12 (Year: 2019).*

*Primary Examiner* — Aniss Chad
*Assistant Examiner* — Madison R. Inserra
(74) *Attorney, Agent, or Firm* — Michael Best & Friedrich LLP (57) ABSTRACT

Systems and methods for detecting a brake event of a vehicle. One system includes an electronic control unit configured to receive a plurality of vehicle signal inputs, wherein the plurality of vehicle signal inputs includes an engine torque, and estimate a wheel torque of a rear wheel of the vehicle based on one or more of the plurality of vehicle signal inputs. The electronic control unit is also configured to determine a difference between the estimated wheel torque and the engine torque, and, in response to the difference being negative and a fault being detected in a brake switch associated with a brake of the rear wheel, activating a brake light of the vehicle.

20 Claims, 6 Drawing Sheets

(56) References Cited

U.S. PATENT DOCUMENTS

| | | | |
|---|---|---|---|
| 10,501,064 B2 | 12/2019 | Pinto, IV et al. | |
| 2007/0222285 A1* | 9/2007 | Ribbens | B60T 8/1703 |
| | | | 303/139 |
| 2007/0247296 A1* | 10/2007 | Moore | B60Q 1/44 |
| | | | 340/467 |
| 2015/0258889 A1* | 9/2015 | Sarai | B60K 17/35 |
| | | | 701/69 |
| 2017/0341634 A1 | 11/2017 | Heise | |
| 2018/0056961 A1 | 3/2018 | Krueger et al. | |
| 2019/0168730 A1 | 6/2019 | Park et al. | |
| 2019/0344767 A1 | 11/2019 | Bareiss et al. | |
| 2019/0344769 A1 | 11/2019 | Zimmermann et al. | |
| 2020/0156608 A1* | 5/2020 | Jeon | B60W 30/18127 |
| 2020/0198636 A1 | 6/2020 | Dhansri et al. | |
| 2020/0207321 A1 | 7/2020 | Plewnia | |

FOREIGN PATENT DOCUMENTS

| | | | | |
|---|---|---|---|---|
| EP | 1172272 A1 | | 1/2002 | |
| EP | 2137036 B1 | | 10/2012 | |
| EP | 2944527 A1 | * | 11/2015 | ............ B60T 8/1706 |
| WO | 2020128080 A1 | | 6/2020 | |

* cited by examiner

BRAKE APPLICATION DETECTION

FIELD

Embodiments described herein generally relate to detecting a brake application in a vehicle and, in particular, to indirectly detecting an application of a brake when a brake switch of the vehicle malfunctions.

SUMMARY

Vehicles are equipped with brakes to perform a brake event such as slowing the vehicle, and, in some cases, bringing the vehicle to a stop. Braking of a vehicle is typically initiated by a driver of the vehicle performing a brake movement (e.g., stepping on a brake pedal, actuating a brake lever, or the like). A brake light switch (also referred to as a "brake switch") detects that a brake event is being performed and sends a signal to a vehicle control unit to activate a brake light. However, in some situations, the brake switch may malfunction, such that the vehicle control unit is not alerted to the brake event and, thus, the brake light is not activated. The brake light offers other vehicles and people located around the vehicle with a visual indication of a brake event. Without the visual indication offered by the brake light, the other vehicles and people around the vehicle may not recognize that the vehicle is being braked (slowing or stopping).

Accordingly, embodiments described in the present application provide systems and methods for detecting a brake application in a vehicle and, in particular, detecting when a fault has occurred with the vehicle's brake switch and, when such a fault is detected, using other vehicle inputs to indirectly detect a braking event and activate a brake light.

For example, one embodiment provides a system for detecting a brake event of a vehicle. The system includes an electronic control unit configured to receive a plurality of vehicle signal inputs, wherein the plurality of vehicle signal inputs includes an engine torque, and estimate a wheel torque of a rear wheel of the vehicle based on one or more of the plurality of vehicle signal inputs. The electronic control unit is also configured to determine a difference between the estimated wheel torque and the engine torque, and, in response to the difference being negative and a fault being detected in a brake switch associated with a brake of the rear wheel, activate a brake light of the vehicle.

Another embodiment provides a method of detecting a brake event of a vehicle. The method includes, receiving, with an electronic control unit, a plurality of vehicle signal inputs, wherein the plurality of vehicle signal inputs includes an engine torque, and estimating, with the electronic control unit, a wheel torque of a rear wheel of the vehicle based on one or more of the plurality of vehicle signal inputs. The method also includes determining, with the electronic control unit, a difference between the estimated wheel torque and the engine torque; and, in response to the difference being negative and a fault being detected in a brake switch associated with a brake of the rear wheel, activating, with the electronic control unit, a brake light of the vehicle.

Yet a further embodiment provides non-transitory computer-readable medium storing instructions that, when executed by one or more electronic processing units, perform a set of functions. The set of functions includes receiving a plurality of vehicle signal inputs, wherein the plurality of vehicle signal inputs includes an engine torque, and estimating a wheel torque of a rear wheel of the vehicle based on one or more of the plurality of vehicle signal inputs. Estimating the wheel torque includes calculating a wheel slip between the rear wheel and a front wheel of the vehicle, and calculating the wheel slip between the rear wheel and the front wheel includes determining a ratio based on a difference between a rear wheel rotation rate and a front wheel rotation rate, multiplying the ratio by a nominal front wheel radius to determine the rear wheel radius, converting the rear wheel rotation rate and the front wheel rotation rate to a front wheel velocity and a rear wheel velocity based on the nominal front wheel radius and the rear wheel radius, respectively, and monitoring a difference between the front wheel velocity and the rear wheel velocity to determine the wheel slip. The set of functions further includes determining a difference between the estimated wheel torque and the engine torque and, in response to the difference being negative and a fault being detected in a brake switch associated with a brake of the rear wheel, activating a brake light of the vehicle.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments provided herein. The apparatus and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed. Furthermore, some embodiments described herein may include one or more electronic control units or controllers. It will be appreciated that these electronic control units or controllers may be comprised of one or more generic or specialized electronic processors, such as, for example, microprocessors, digital signal processors, customized processors, and field programmable gate arrays (FPGAs) and unique stored program instructions (including both software and firmware) that control the one or more electronic control units or controllers to implement the functionality described herein.

Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. Moreover, relational terms such as first and second, top and bottom, and the like may be used herein solely to distinguish one entity or action from another entity or action without necessarily requiring or implying any actual such relationship or order between such entities or actions.

As described above, embodiments described in the present application provide systems and methods for indirectly detecting an application of a vehicle brake when a brake switch of the vehicle malfunctions. Embodiments are described herein with respect to a motorcycle. However, it should be understood that the components and associated functionality described herein are not limited to motorcycles but can be used in any type of vehicle (for example, a moped, an electric bicycle, a three-wheeled vehicle, a passenger vehicle, a semi-truck, and the like).

Figure 1:
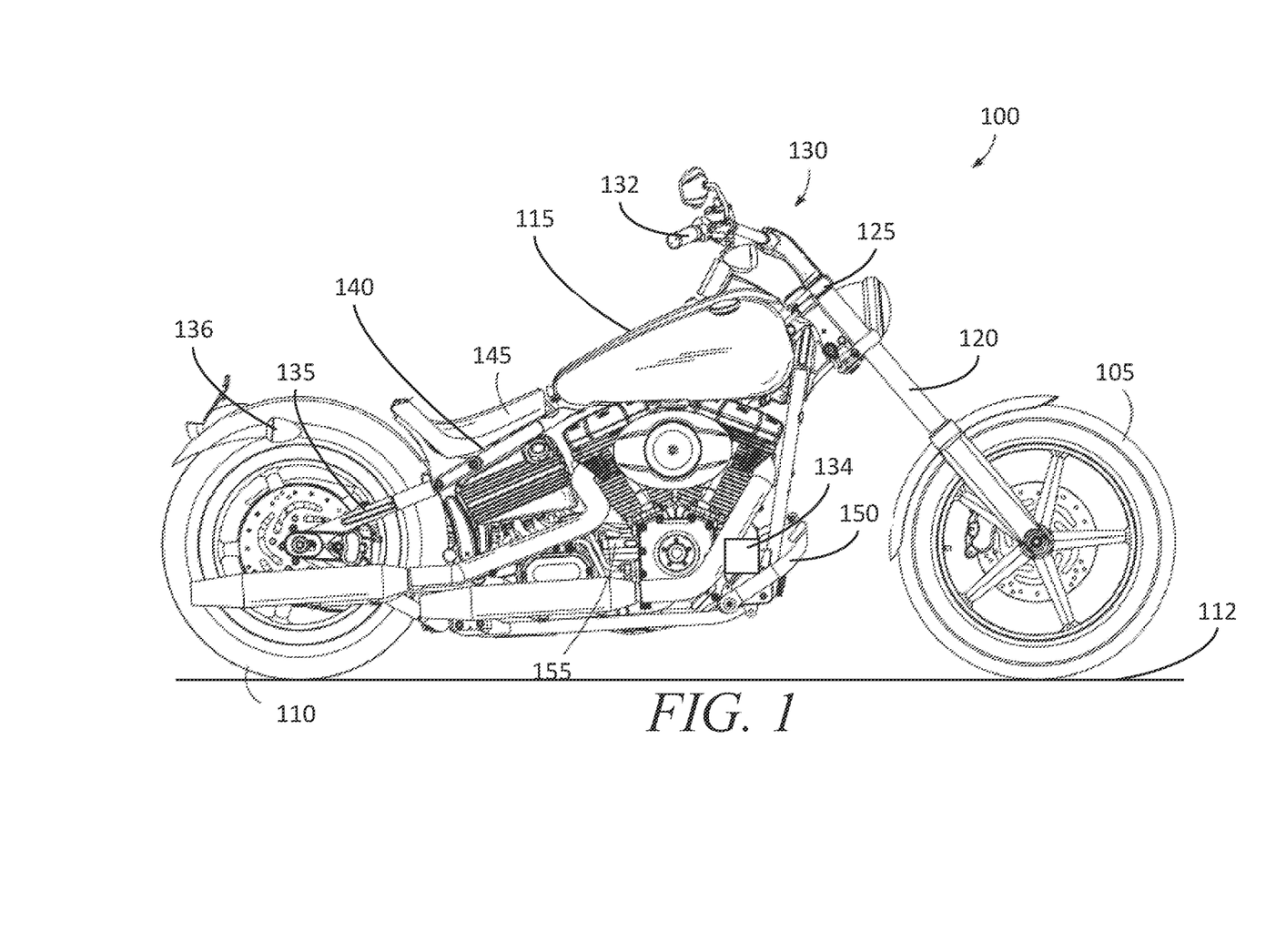
FIG. 1 is planar view of a motorcycle according to some embodiments.

FIG. 1 is a planar view of a motorcycle 100 according to some embodiments. The motorcycle 100 includes front and rear wheels 105, 110 (for example, a single front wheel 105 and a single rear wheel 110 aligned with the front wheel 105 to define a single track). The front and rear wheels 105, 110 engage with a surface 112. The surface 112 may be pavement, gravel, or the like. The motorcycle 100 also includes a frame structure having a main frame 115. A front fork 120 supports the front wheel 105 ahead of the main frame 115. The front fork 120 is rotatably coupled to a head tube 125 of the main frame 115.

Handlebars 130 are coupled to the front fork 120 to allow a rider to control the orientation of the front fork 120 and the front wheel 105. In some embodiments, a brake control lever 132 is coupled to the handlebars 130. The brake control lever 132 is movable by grip pressure of a rider's hand to operate a brake actuator, such as a master cylinder that applies hydraulic brake fluid pressure to at least one brake of the motorcycle 100, such as, for example, one or more disc brakes. For example, in some embodiments, the motorcycle 100 includes a front brake and a rear brake, wherein the front and rear brakes apply deceleration torque to the front and rear wheels 105, 110, respectively. It should be understood that a brake for one or more of the front and rear wheels 105, 110 may be activable through other mechanisms than a pivotable lever as illustrated in FIG. 1. For example, in some embodiments, the brake control lever 132 is activable by a rider to apply a front brake and a foot lever 150 included in the motorcycle 100 is activatable by the rider to apply a rear brake.

The motorcycle 100 also includes one or more brake switches that detect when a brake has been applied. For example, in some embodiments, the motorcycle 100 includes a rear brake switch 134. The rear brake switch 134 may include an electrical switch maintained in an open position when the brake has not been activated. In response to the rider activating a brake (for example, by applying pressure to the foot lever 150), a spring causes the rear brake switch 134 to close, which completes an electrical circuit causing a signal to be output indicating that the rear brake is being applied. This signal can be used to control activation of a brake light 136 of the motorcycle 100.

In some embodiments, the motorcycle 100 also includes one or more user interfaces, such as one or more liquid crystal displays (LCDs), lights or indicators, light emitting diodes (LEDs), heads-up displays, or the like, to provide information to the rider. For example, the one or more user interfaces may display a speed of the motorcycle 100, a fuel or battery capacity of the motorcycle 100, an odometer, and, in some embodiments, fault information. For example, in some embodiments, one of the user interfaces include a fault illumination or indicator lamp (FM), which can be activated in response to detecting one or more vehicle faults.

As illustrated in FIG. 1, the motorcycle 100 further includes a rear swingarm 135 that supports the rear wheel 110 for rotation therein. The rear swingarm 135 enables pivoting suspension movements of the rear wheel 110 and the swingarm 135 together relative to the main frame 115. In addition to the pivoting support, the swingarm 135 is coupled to the main frame 115 through a shock absorber unit 140 (for example, including a coil spring and a hydraulic damper). The motorcycle 100 further includes at least one seat 145 (for example, a saddle seat for a rider and, optionally, a pillion for a passenger) and at least one set of foot supports (for example, laterally extending foot pegs). In some embodiments, the foot lever 150 described above for activating a rear brake of the motorcycle 100 may be coupled to one of the foot supports. The motorcycle 100 also includes an engine 155. In some embodiments, the engine 155 is an internal combustion engine.

As noted above, during normal operation of the motorcycle 100, one or more brake lights are activated when a brake event is detected by a brake switch included in the motorcycle. However, in the event that a brake is being applied but the brake light switch fails, the one or more brake lights are not activated. To address these and other issues, embodiments described herein provide methods and systems for indirectly detecting brake events using alternative inputs (separate from the brake switch signal) and activating the brake light accordingly.

Figure 2:
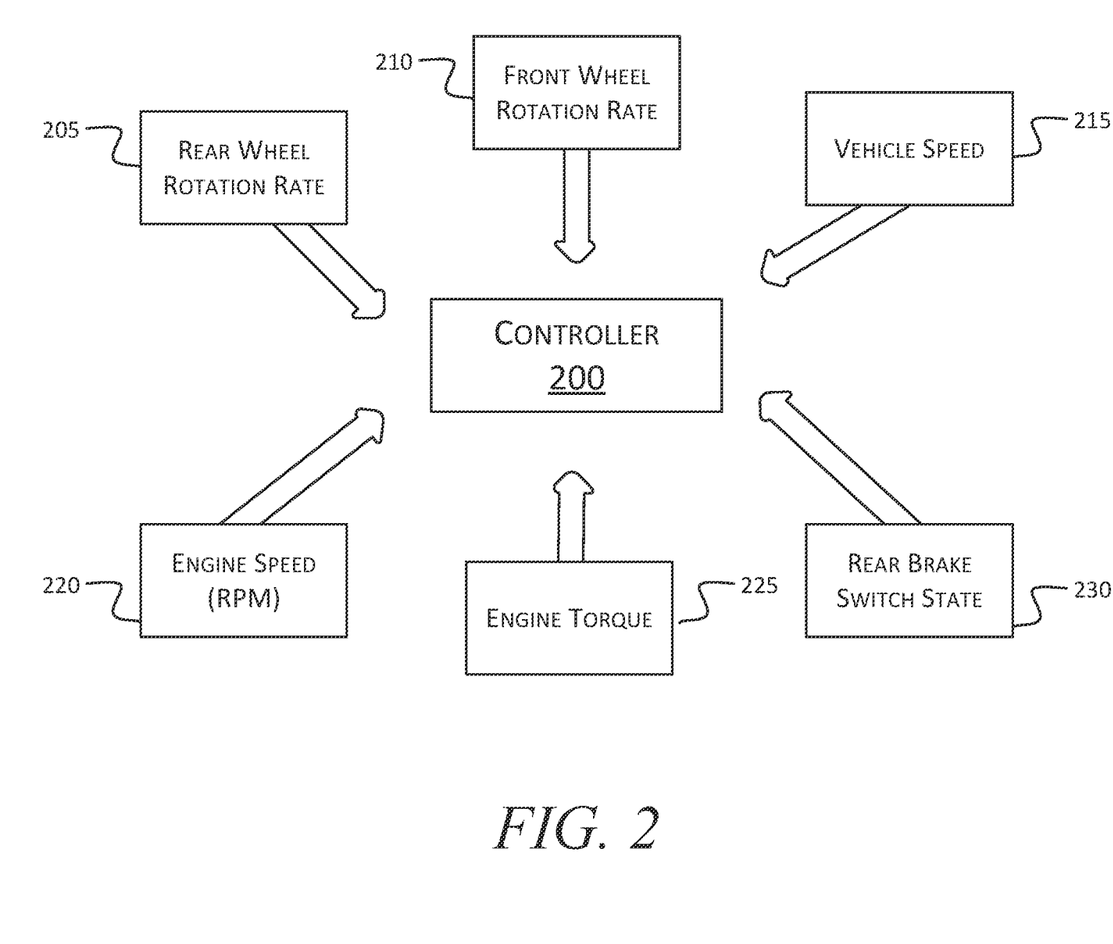
FIG. 2 is a schematic diagram illustrating signal inputs to an electronic control unit of the motorcycle of FIG. 1 according to some embodiments.

For example, FIG. 2 is a schematic diagram illustrating signal inputs received by an electronic control unit 200 of the motorcycle 100 according to some embodiments. In some embodiments, the electronic control unit 200 includes a body control module (BCM) of the motorcycle 100. As illustrated in FIG. 2, the signal inputs received via the electronic control unit 200 includes a rear wheel rotation rate 205, a front wheel rotation rate 210, a vehicle speed 215, an engine speed 220, an engine torque 225, and a rear brake switch state 230. In some embodiments, the electronic control unit 200 receives the signal inputs over a communication bus, such as a controller area network (CAN) bus included in the motorcycle 100. Alternatively or additionally, the electronic control unit 200 may receive one or more signal inputs from one or more devices, sensors, or a combination thereof included in the motorcycle 100 over a direct wired or wireless connection. For example, in some embodiments, the electronic control unit 200 receives the rear brake switch state 230 over a direct connection with the rear brake switch 134.

The rear wheel rotation rate 205 and the front wheel rotation rate 210 represent a rate a rotation of the rear wheel 110 and the front wheel 105, respectively. These rates may be defined in terms of rotations per time period, such as, for example, rotations or revolutions per minute (RPM). These rates 205 may be determined based on data sensed via one or more wheel rotation sensors included in the motorcycle 100, which may include one or more optical or magnetic sensors, such as, for example, one or more Hall Effect sensors.

The vehicle speed 215 represents a speed of the motorcycle 100 defined in terms of distance per time period, such as, for example, miles per hour or kilometers per hour. The vehicle speed 215 may be determined based on data sensed via one or more vehicle speed sensors included in the motorcycle 100, which may include one or more inductive, optical, or radar sensors. Alternatively, in some embodiments, the vehicle speed 215 may be calculated based on other sensed data, such as wheel speed. Furthermore, in some embodiments, the vehicle speed 215 is determined based on global positioning system (GPS) data collected via a GPS receiver included in the motorcycle 100.

The engine speed 220 represents a number of revolutions (for example, of a crankshaft) of the engine 155 per time period, such as, for example, RPM. The engine speed 220 may be based on data sensed via one or more engine speed sensors included in the motorcycle 100, such as, for example, one or more tachometers. The engine torque 225 represents an output torque from the engine 155. In some embodiments, this signal input is based on an amount of fuel and air entering the engine 155.

The rear brake switch state 230 represents an operating state of the brake switch 134 (for example, open or closed, off or on, or "brake not applied" or "brake applied").

Figure 3:
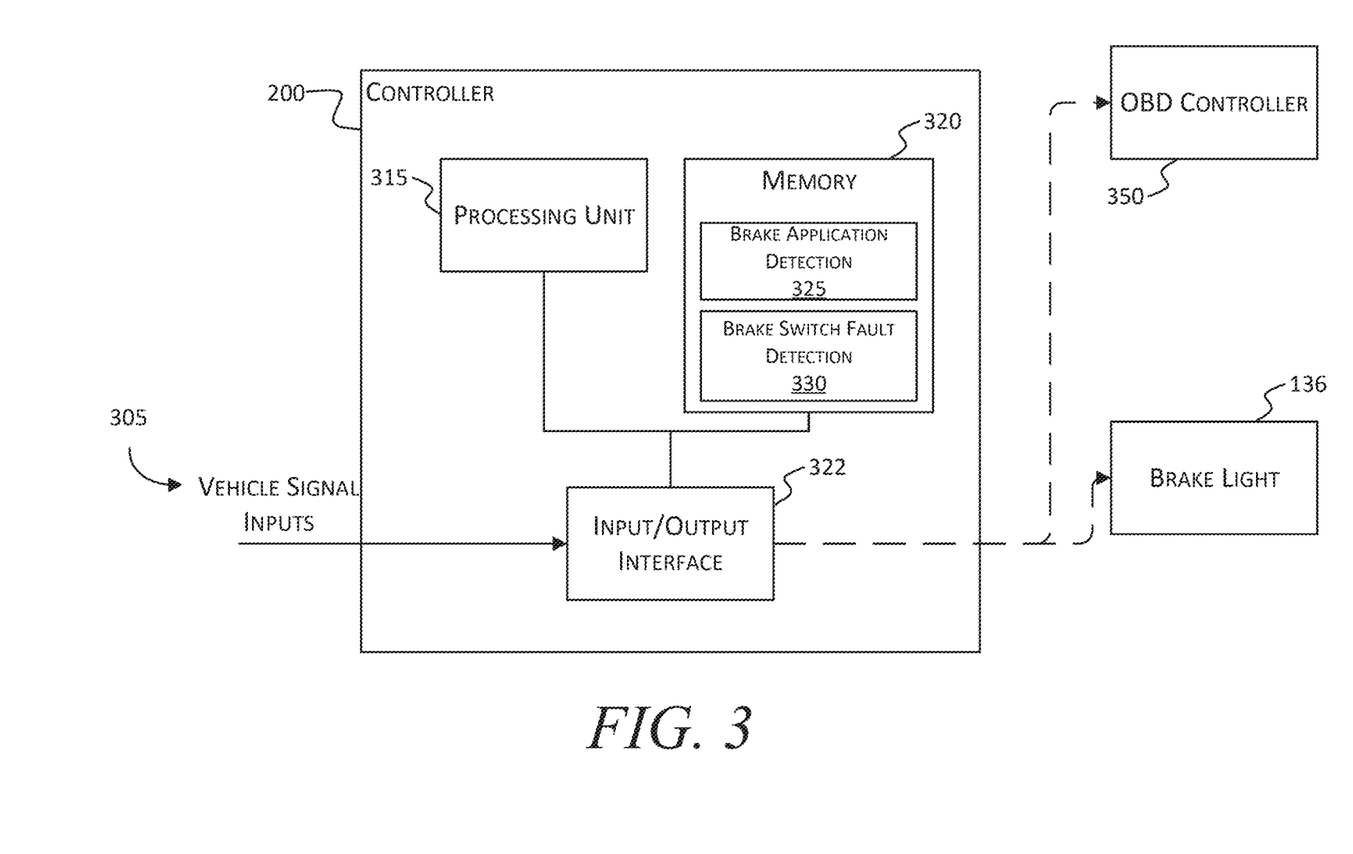
FIG. 3 is a schematic diagram illustrating the electronic control unit of FIG. 2 according to some embodiments.

The electronic control unit 200 includes a plurality of electrical and electronic components that provide power, operational control, and protection to the components and modules within the electronic control unit 200. For example, FIG. 3 schematically illustrates the electronic control unit 200 according to some embodiments. As illustrated in FIG. 3, the electronic control unit 200 includes an electronic processing unit 315 (for example, an electronic microprocessor, microcontroller, or similar device), a memory 320 (for example, non-transitory, computer-readable memory), and an input/output (I/O) interface 322. The electronic control unit 200 may include additional or alternative components, including additional electronic processors and memory, or application specific integrated circuits (ASICs), as well as one or more input devices, output devices, or a combination thereof.

The components of the electronic control unit 200 may be connected in various ways including, for example, a local bus. The processing unit 315 is communicatively coupled to the memory 320 and executes instructions stored on the memory 320. For example, in some embodiments, the processing unit 315 is configured to retrieve from the memory 320 and execute, among other things, instructions related to the control processes and methods described herein. For example, as illustrated in FIG. 3, the memory 320 may store a brake application detection module 325 and a brake switch fault detection module 330 to perform the functionality described herein. It should be understood that the instructions and associated functionality as described herein may be combined and distributed in various ways and, in some embodiments, the electronic control unit 200 may include a separate processing unit for the modules 325 and 330 or may distribute the functionality described herein as being performed by the modules 325 and 330 among fewer or additional modules. The memory 320 may also store parameters used by the modules 325 and 330, such as, for example, one or more thresholds.

The input/output interface 322 communicates with one or more devices or networks external to the electronic control unit 200, such as, for example, a CAN bus. As illustrated in FIG. 3, the input/output interface 322 receives vehicle signal inputs 305. In some embodiments, the vehicle signal inputs 305 include the rear wheel rotation rate 205, the front wheel rotation rate 210, the vehicle speed 215, the engine speed 220, the engine torque 225, and the rear brake switch state 230 as described above.

As illustrated in FIG. 3, the input/output interface 322 also communicates with the brake light 136 and an on-board diagnostic (OBD) system 350 included in the motorcycle 100. As described in more detail below, when the electronic control unit 200 detects a brake switch fault and indirectly detects a brake application (a brake event), the electronic control unit 200 is configured to activate a FIL, set a diagnostic trouble code (DTC), and activate the brake light 136. In some embodiments, the electronic control unit 200 communicates with the OBD system 350 (for example, through the CAN bus) to activate one or more FILs, set one or more DTCs, or both. An OBD scanner or other external device may interface with the OBD system 350 to read the DTC, which may allow maintenance personnel to identify what type of fault was detected and take appropriate action to address the fault, such as, for example, replacing or repairing the brake switch 134. Similarly, the electronic control unit 200 may communicate with the brake light 136 directly, over a communication network, such as the CAN bus, or through one or more intermediary devices.

As described in more detail below, the brake application detection module 325 is configured to indirectly determine when a brake has been applied based on one or more signals included the vehicle signal inputs 305 and, when a brake light switch fault has been detected, activate the brake light switch based on the indirectly detected brake event. The brake application detection module 325 is also configured to output a signal to the brake switch fault detection module 330 indicating whether a brake event was indirectly detected. As also described in more detail below, the brake switch fault detection module 330 is configured to detect a fault of the brake switch 134 based on input from the brake application detection module 325 and one or more signals included in the vehicle signal inputs 305.

Figure 4A:
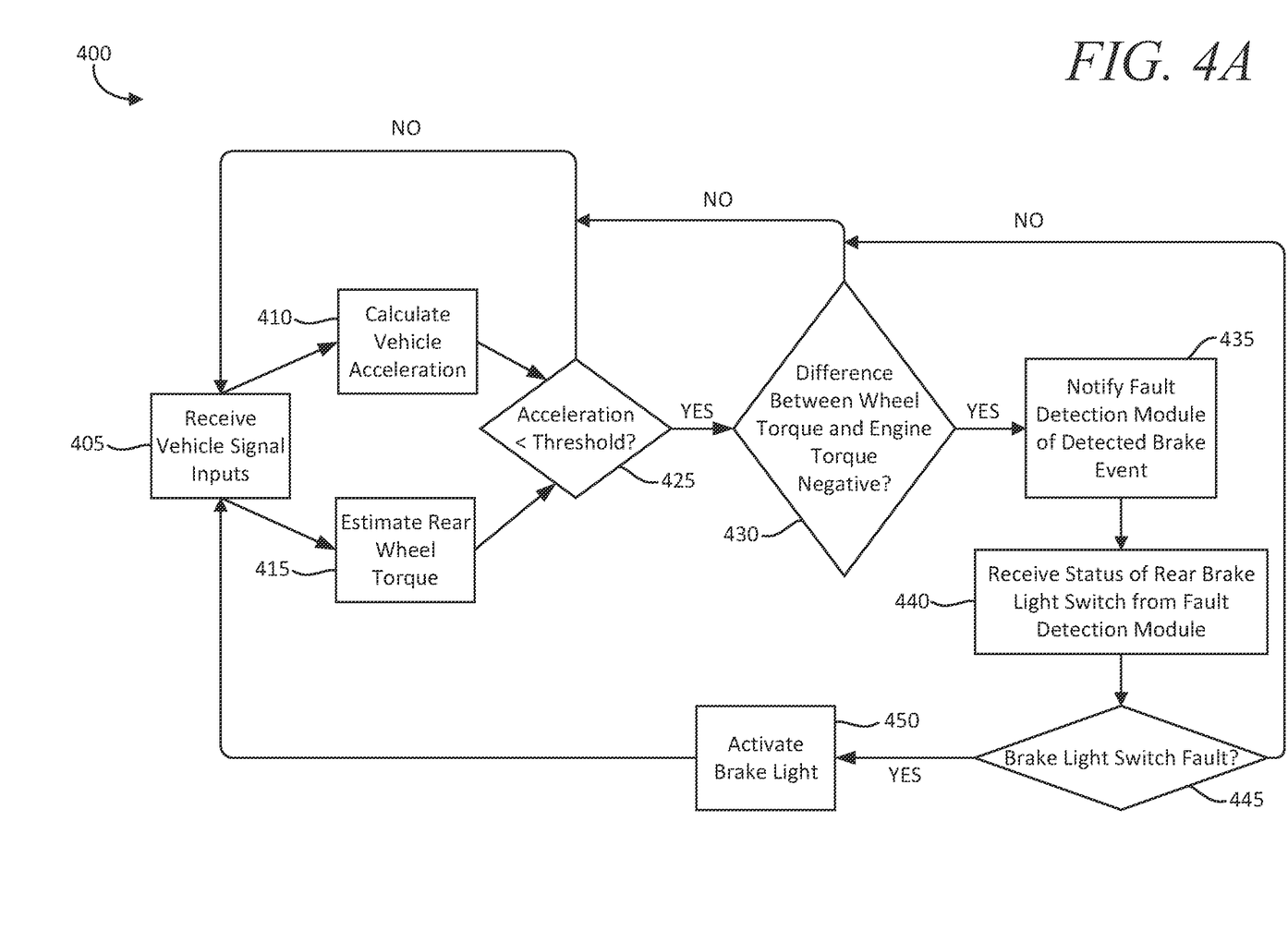
FIG. 4A is a flowchart illustrating a method of indirectly detecting a brake application according to some embodiments.

FIG. 4A is a flowchart illustrating a method 400 of indirectly detecting a brake application according to some embodiments. The method 400 is described herein as being performed by the electronic control unit 200, and, in particular, the brake application detection module 325 as executed via the processing unit 315. However, as noted above, the functionality described herein can be distributed among multiple modules, devices (processing units), or a combination thereof.

As illustrated in FIG. 4A the method 400 includes receiving, with the brake application detection module 325, one or more of vehicle signal inputs 305 (at block 405). For example, in some embodiments, the brake application detection module 325 receives the rear wheel rotation rate 205, the front wheel rotation rate 210, the vehicle speed 215, the engine speed 220, the engine torque 225, and the brake switch state 230. Based on the received vehicle signal inputs 305, the module 325 calculates vehicle acceleration (at block 410) and estimates rear wheel torque (at block 410). In some embodiments, the module 325 calculates the vehicle acceleration based on the vehicle speed 215, such as, for example by taking a derivative of the vehicle speed input signal. In other embodiments, the module 325 calculates vehicle acceleration using a signal from one or more sensors, such as, for example, one or more acceleration sensors.

The module 325 estimates the rear wheel torque using an estimated wheel (tire) radius of the rear wheel 110 and a calculated wheel slip (at block 415). In some embodiments, the module 325 estimates a radius of the rear wheel 110 by observing a difference in rotation rates between the front wheel 105 and the rear wheel 110 (difference between rates 205 and 210) to monitor a ratio of front wheel radius to rear wheel radius. The module 325 applies this ratio to a nominal front wheel radius to estimate the rear wheel radius. The nominal front wheel radius may be stored in the memory 320 and accessed by the module 325.

Figure 5:
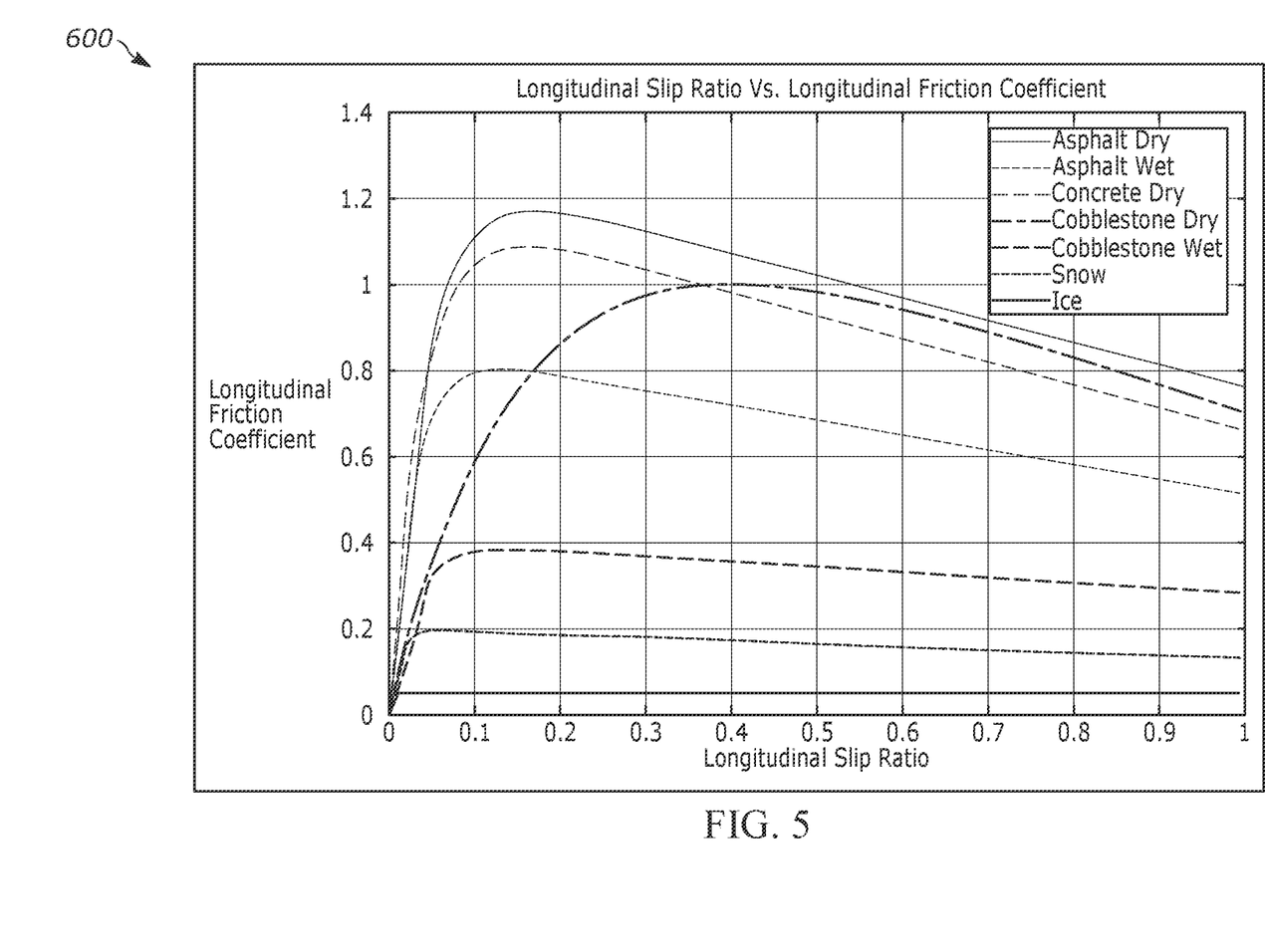
FIG. 5 illustrates a Pacejka curve utilized by the electronic control unit of FIG. 2 according to some embodiments.

Based on the estimated rear wheel radius, the module 325 calculates wheel slip. For example, the module 325 may calculate wheel slip by looking at a difference in wheel velocities (representing a "longitudinal slip ratio"). In particular, the rotation rates 205 and 210 described above can be converted to velocities using the nominal front wheel radius and the calculated rear wheel radius. This wheel slip can be multiplied by a factor using, for example, the Pacejka formula. The Pacejka formula shows that for small wheel slip the amount of torque is directly proportional to the amount of wheel slip. The graph 600 of FIG. 5 illustrates Pacejka curves for various surfaces 112. In some embodiments, the module 325 multiples observed wheel slip by a factor that represents the slope of a Pacejka curve in the nearly linear region at low slip (for example, on the left side of the graph 600), when there is a low wheel slip ratio. Based on the multiplied wheel slip, the module 325 calculates a rear wheel torque for surfaces 112 with good grip (for example, dry asphalt, wet asphalt, and dry concrete). In other words, the target forces that the module 325 is looking for (to indirectly detect braking events) are below the limit braking level. Thus, the module 325 uses a single to calculate a wheel torque estimate from a given amount of slip that is valid in the region of interest (for, example, on the left side of the graph 600). As noted above, the approximated wheel torque values are valid for surfaces with a good grip. Accordingly, in some embodiments, the module 325 also acts as a second observer to identify "low-grip" situations where indirect brake detection as described herein may not be accurate and, thus, this detection may be disabled.

As illustrated in FIG. 4A, the module 325 applies various predetermined thresholds to the calculated vehicle acceleration and the estimated rear wheel torque to indirectly detect whether a brake is being applied to the rear wheel 110. For example, the module 325 determines whether the calculated vehicle acceleration is less than a predetermined threshold value (at block 425). In some embodiments, the predetermined threshold acceleration value may be 5 meters per second ($ms^{-2}$). However, other threshold acceleration values may be used based on characteristics of the vehicle, driving conditions, road conditions, or the like and the 5 meters per second threshold acceleration value is provided as one example. When the module 325 determines that the calculated vehicle acceleration is not less than the predetermined threshold acceleration value (for example, the acceleration is greater than the threshold acceleration value) (NO at block 425), the method 400 proceeds back to the start (at block 405).

The module 325 also determines whether a difference between the rear wheel torque and the engine torque 225 is negative (at block 430). The module may determine the difference by subtracting the estimated rear wheel torque from the engine torque 225. A negative difference between these values represents that a torque is being applied to the rear wheel 110 that is not from the engine 155. In other words, when this difference is negative, a torque is being applied to the rear wheel 110 by a source other than the engine 155, such as via a rear brake. When the module 325 determines that the difference is not negative (NO at block 430), the method 400 proceeds back to the start (at block 405).

As illustrated in FIG. 4A, when the calculated vehicle acceleration is less than the threshold acceleration value (at block 425) and the difference between the estimated rear wheel torque and the engine torque 225 is negative (at block 430), the module 325 concludes that the rear brake is being applied to the rear wheel 110, and the module 325 notifies the brake switch fault detection module 330 of the indirectly detected brake event (at block 435). As described in more detail below, the brake switch fault detection module 330 uses the notification of the indirectly detected brake event to determine whether the brake switch 134 is malfunctioning.

As illustrated in FIG. 4A, the brake application detection module 325 also receives a status of the rear brake switch 134 from the brake switch fault detection module 330 (at block 440). In response to the received status indicating that the brake switch 134 is malfunctioning (there is a fault with the brake switch 134 (at block 445), the module 325 activates the brake light 136 (at block 450). In some embodiments, the module 325 activating the brake light 136 by sending a signal to the brake light 136 via the input/output interface 322. As illustrated in FIG. 4A, after activating the brake light 136 (at block 450) or in response to the brake switch not malfunctioning (at block 445), the method 400 proceeds back to the start and the module 325 cycles through the method 400 again.

Figure 4B:
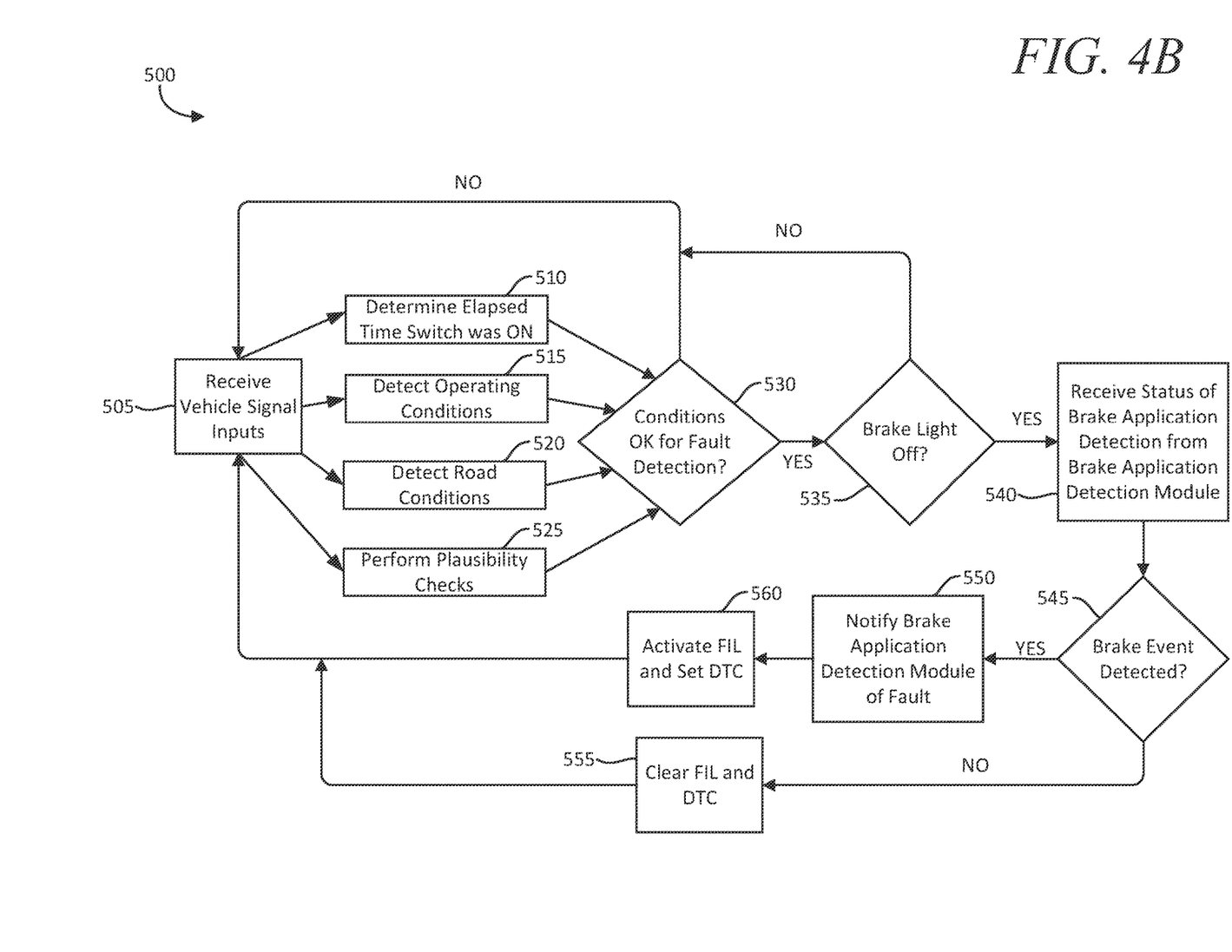
FIG. 4B is a flowchart illustrating a method of detecting a brake switch fault according to some embodiments.

FIG. 4B is a flowchart illustrating a method 500 of detecting a brake light switch fault according to some embodiments. The method 500 is described herein as being performed by the electronic control unit 200, and, in particular, the brake switch fault detection module 330 as executed via the processing unit 315. However, as noted above, the functionality described above can be distributed among multiple modules, devices (processing units), or a combination thereof.

As illustrated in FIG. 4B, the module 330 receives one or more signals included in the vehicle signal inputs 305 (at block 505). For example, in some embodiments, the module 330 receives the rear wheel rotation rate 205, the front wheel rotation rate 210, the vehicle speed 215, the engine speed 220, the engine torque 225, and the brake switch state 230 as described above. The module 330 uses these inputs to determine whether the brake switch 134 is faulty.

For example, the module 330 determines an elapsed time since the rear brake switch 134 was ON (indicating that a brake event was detected) (at block 510). For example, it may be difficult to indirectly detect a braking event as described herein accurately at the tail end of a braking event (for example, where a brake is no longer being applied but the motorcycle 100 may still be decelerating). Accordingly, the module 330 may be configured to track how much time has passed since the brake switch 134 was ON and not activate indirect brake detection (performed via the module 325 as described above) during a period of time after a braking event is ending. For example, in some embodiments, the module 330 may not activate indirectly braking detection during a predetermined amount of time or threshold after a brake switch changes from ON to OFF, such as, for example, 1.0 second after this transition. The 1.0 second time period may vary depending on a characteristic of the vehicle, driving conditions, road conditions, etc. and the 1.0 second time period is provided as one example period.

As illustrated in FIG. 4B, the module 330 also uses the signal inputs to detect one or more operating conditions of the motorcycle that may not be conducive to indirect brake detection (at block 515). These operating conditions may be referred to herein as "one or more conditions existing for fault detection" and these conditions represent conditions that prevent accurate indirect brake detection, accurate detection of brake switch faults, or a combination thereof. As one non-limiting example, these operating conditions may include determining whether the clutch of the motorcycle 100 is partially engaged, which may appear (to the module 325) as a brake event. In some embodiments, the module 330 uses the rear wheel rotation rate 205 and the engine speed 220 to determine whether the clutch is partially engaged. Alternatively, or additionally, in some embodiments, the module 330 uses the rear wheel rotation rate 205 and the engine torque 225 to determine that the clutch is partially engaged.

The module 330 also detects road conditions (at block 520). Similar to the vehicle operating conditions detected at block 515, the road conditions detected at block 520 may represent road conditions (for example, conditions associated with the surface 112) that prevent accurate indirect brake detection, accurate detection of brake switch faults, or a combination thereof. For example, when the motorcycle 100 is driven on gravel surfaces or other slippery surfaces, rapid wheel deceleration and recovery may appear as brake events. In some embodiments, as noted above, the module 330 uses one or more Pacejka curves (for example, stored in the memory 320) to determine characteristics regarding the surface 112.

The module 330 also performs one or more plausibility checks (at block 525). These checks determine whether received signal inputs are plausible. In some embodiments, the module 330 references one or more stored limits and parameters in the memory 320 to check whether a particular signal input is within one or more predefined ranges to ensure no rapid changes are occurring that are unusual for a brake event.

As illustrated in FIG. 4B, the module 330 uses the results of blocks 510, 515, 520, and 525 to determine whether conditions are appropriate for detecting a fault of the brake switch 134 (at block 530). When all of the conditions (for example, the elapsed time associated with the brake switch 134, the operating conditions, the road conditions, and the plausibility checks) are satisfied, the module 330 proceeds to detect a brake switch fault. Alternatively, when one or more of the conditions are not satisfied, the module 330, the method 500 repeats (at block 505).

As illustrated in FIG. 4B, to detect a fault in the brake switch 134, the module 330 determines whether the brake light 136 is OFF (at block 535). The module 330 may reference the rear brake switch state 230 to determine whether the brake light 136 is OFF. In other embodiments, the module 330 may look at a state of the brake light 136 directly (for example, using a dedicated connection between the electronic control unit 200 and the brake light switch 134 as described above). When the module 330 determines that the brake light 136 is not OFF (the brake light 136 is ON) (NO at block 535), the method 500 proceeds back to the start (block 505). In particular, when the brake light is on, the brake switch 134 is likely operating properly and no fault has occurred. As illustrated in FIG. 4B, when the module 330 determines that a brake event was not indirectly detected (NO at block 545), the module 330 may clear any previously activated FIL and clear ay previously set DTC (at block 555). After clearing the FIL and the DTC, the method 500 returns to the start (at block 505).

Alternatively, when the module 330 determines that the brake light 136 is OFF (YES at block 535), the method 500 proceeds to block 540 where the module 330 receives a status of a brake application detection from the brake application detection module 325 (at block 540). As described above with respect to FIG. 4A, the brake application detection module 325 indirectly detects a brake event and notifies the module 330 of any detected brake event. Accordingly, when the module 330 receives a notification that a brake event was indirectly detect via the module 325 (at block 545), the module 330 concludes that the brake switch 134 is malfunctioning. In particular, if the brake light 136 is off (at block 535) but a brake event was indirectly detected (at 540), the brake switch 134 is likely malfunctioning.

When the module 330 determines that a brake event was detected (YES at block 545), the method 500 notifies the brake application detection module 325 of a fault (at block 550). As noted above with respect to FIG. 4A, the module 325 uses the fault notification as a trigger to control activation of the brake light 136 based on an indirectly detected brake event. As illustrated in FIG. 4B, when the brake switch 134 fault is detected (YES at block 545), the brake switch fault detection module 330 also activates the FIL and sets the DTC (at block 560). The method 500 returns to the start for repeated operation (at block 505).

Accordingly, the systems and methods described herein provide indirect detection of brake events when a brake switch of a vehicle, such as a motorcycle, malfunctions or otherwise is faulty. This indirect detection can be used to control activation of a brake light of the vehicle, which may, otherwise, not be properly activated. Although the functionality described above in FIGS. 4A and 4B is with respect to a rear brake application, the functionality can be used respect to brake application of any wheel of a vehicle. Additionally, the functionality described above is with respect to a detected fault of a braking switch. However, it should be understood that similar functionality can be for other types of braking-related faults, such as, for example, a pressure sensor fault associated with a wheel brake.

Various features and advantages of some embodiments are set forth in the following claims.

What is claimed:

1. A system for detecting a brake event of a vehicle, the system comprising:
an electronic control unit configured to:
receive a plurality of vehicle signal inputs, wherein the plurality of vehicle signal inputs includes an engine torque,
estimate a wheel torque of a rear wheel of the vehicle based on one or more of the plurality of vehicle signal inputs,
determine a negative difference between the estimated wheel torque and the engine torque representing that a braking torque is being applied to the rear wheel, and
in response to the negative difference and a fault being detected in a brake switch associated with a brake of the rear wheel, activate a brake light of the vehicle.

2. The system of claim 1, wherein the electronic control unit is configured to estimate the wheel torque by calculating a wheel slip between the rear wheel and a front wheel of the vehicle.

3. The system of claim 2, wherein the plurality of vehicle signal inputs further includes a sensed rear wheel rotation rate and a sensed front wheel rotation rate and wherein the electronic control unit is configured to calculate the wheel slip based on the sensed rear wheel rotation rate and the sensed front wheel rotation rate.

4. The system of claim 3, wherein the electronic control unit is configured to calculate the wheel slip based on the sensed rear wheel rotation rate and the sensed front wheel rotation rate by:
estimating a rear wheel radius; and
calculating the wheel slip based on the rear wheel radius.

5. The system of claim 4, wherein the electronic control unit is configured to estimate the rear wheel radius by:
determining a ratio based on a difference between the rear wheel rotation rate and the front wheel rotation rate; and
multiplying the ratio by a nominal front wheel radius to determine the rear wheel radius.

6. The system of claim 5, wherein the electronic control unit is configured to calculate the wheel slip based on the rear wheel rotation rate and the front wheel rotation rate by:
converting the rear wheel rotation rate and the front wheel rotation rate to a front wheel velocity and a rear wheel velocity based on the nominal front wheel radius and the rear wheel radius, respectively; and
monitoring a difference between the front wheel velocity and the rear wheel velocity to determine the wheel slip.

7. The system of claim 2, wherein the electronic control unit is configured to estimate the wheel torque by calculating the wheel slip between the rear wheel and the front wheel and multiplying the wheel slip by a factor.

8. The system of claim 7, wherein the factor is a slope of a Pacejka curve.

9. The system of claim 1, wherein the electronic control unit is further configured to calculate an acceleration of the vehicle and wherein the electronic control unit is configured to activate the brake light in response to the negative difference, the fault being detected in the brake switch, and the acceleration of the vehicle being less than a predetermined threshold.

10. The system of claim 1, wherein the electronic control unit is further configured to detect the fault in the brake switch, wherein the electronic control unit is configured to detect the fault in the brake switch by:
detecting one or more conditions existing for fault detection;
detecting whether the brake light is off; and
detecting the fault in the brake switch in response to the one or more conditions existing for fault detection, the brake light being off, and the negative difference.

11. The system of claim 10, wherein the electronic control unit is further configured to activate a fault indicator lamp and set a diagnostic trouble code in response to detecting the fault in the brake switch.

12. The system of claim 10, wherein the one or more conditions includes at least one:
an elapsed time since the brake switch was ON being greater than a predetermined threshold;
a clutch of the vehicle is not partially engaged; and
the vehicle not being operated on a gravel surface.

13. A method of detecting a brake event of a vehicle, the method comprising:
receiving, with an electronic control unit, a plurality of vehicle signal inputs, wherein the plurality of vehicle signal inputs includes an engine torque;
estimating, with the electronic control unit, a wheel torque of a rear wheel of the vehicle based on one or more of the plurality of vehicle signal inputs;
determining, with the electronic control unit, a negative difference between the estimated wheel torque and the engine torque representing that a braking torque is being applied to the rear wheel;
in response to the negative difference and a fault being detected in a brake switch associated with a brake of the rear wheel, activating, with the electronic control unit, a brake light of the vehicle.

14. The method of claim 13, wherein estimating the wheel torque includes calculating a wheel slip between the rear wheel and a front wheel of the vehicle, wherein calculating the wheel slip between the rear wheel and the front wheel includes calculating the wheel slip based on a rear wheel rotation rate and a front wheel rotation rate.

15. The method of claim 14, wherein calculating the wheel slip based on the rear wheel rotation rate and the front wheel rotation rate includes:
estimating a rear wheel radius; and
calculating the wheel slip based on the rear wheel radius.

16. The method of claim 15, wherein estimating the rear wheel radius includes:
determining a ratio based on a difference between the rear wheel rotation rate and the front wheel rotation rate; and
multiplying the ratio by a nominal front wheel radius to determine the rear wheel radius,
wherein calculating the wheel slip based on the rear wheel rotation rate and the front wheel rotation rate includes:
converting the rear wheel rotation rate and the front wheel rotation rate to a front wheel velocity and a rear wheel velocity based on the nominal front wheel radius and the rear wheel radius, respectively, and
monitoring a difference between the front wheel velocity and the rear wheel velocity to determine the wheel slip.

17. The method of claim 14, wherein estimating the wheel torque includes calculating the wheel slip between the rear wheel and the front wheel and multiplying the wheel slip by a factor, wherein the factor is a slope of a Pacejka curve.

18. The method of claim 13, further comprising calculating an acceleration of the vehicle and wherein activating the brake light includes activating the brake light in response to the negative difference, the fault being detected in the brake switch, and the acceleration of the vehicle being less than a predetermined threshold.

19. The method of claim 13, further comprising detecting the fault in the brake switch by:
   detecting one or more conditions existing for fault detection;
   detecting whether the brake light is off; and
   detecting the fault in the brake switch in response to the one or more conditions existing for fault detection, the brake light being off, and the negative difference, wherein the one or more conditions includes at least one:
   an elapsed time since the brake switch was ON being greater than a predetermined threshold,
   a clutch of the vehicle is not partially engaged, and
   the vehicle not being operated on a gravel surface.

20. Non-transitory computer-readable medium storing instructions that, when executed by one or more electronic processors, perform a set of functions, the set of functions comprising:
   receiving a plurality of vehicle signal inputs associated with a vehicle, wherein the plurality of vehicle signal inputs includes an engine torque;
   estimating a wheel torque of a rear wheel of the vehicle based on one or more of the plurality of vehicle signal inputs, wherein estimating the wheel torque includes calculating a wheel slip between the rear wheel and a front wheel of the vehicle, wherein calculating the wheel slip between the rear wheel and the front wheel includes:
      determining a ratio based on a difference between a rear wheel rotation rate and a front wheel rotation rate,
      multiplying the ratio by a nominal front wheel radius to determine a rear wheel radius,
      converting the rear wheel rotation rate and the front wheel rotation rate to a front wheel velocity and a rear wheel velocity based on the nominal front wheel radius and the rear wheel radius, respectively, and
      monitoring a difference between the front wheel velocity and the rear wheel velocity to determine the wheel slip;
   determining a negative difference between the estimated wheel torque and the engine torque representing that a braking torque is being applied to the rear wheel; and
   in response to the negative difference and a fault being detected in a brake switch associated with a brake of the rear wheel, activating a brake light of the vehicle.

* * * * *